(12) United States Patent
Valle et al.

(10) Patent No.: US 9,475,468 B2
(45) Date of Patent: Oct. 25, 2016

(54) CALIPER BODIES MADE FROM THERMOPLASTIC MATERIAL

(75) Inventors: Massimiliano Valle, Bergamo (IT); Niccolo' Ignazio Maria Pini, Zurigo (CH)

(73) Assignee: Petroceramics S.p.A., Milan (IT)

( * ) Notice: Subject to any disclaimer, the term of this patent is extended or adjusted under 35 U.S.C. 154(b) by 32 days.

(21) Appl. No.: 14/116,354

(22) PCT Filed: May 9, 2011

(86) PCT No.: PCT/IT2011/000142
§ 371 (c)(1),
(2), (4) Date: Feb. 25, 2014

(87) PCT Pub. No.: WO2012/153355
PCT Pub. Date: Nov. 15, 2012

(65) Prior Publication Data
US 2014/0158488 A1   Jun. 12, 2014

(51) Int. Cl.
*F16D 65/00*     (2006.01)
*B60T 1/06*      (2006.01)
*F16D 55/00*     (2006.01)

(52) U.S. Cl.
CPC .......... *B60T 1/065* (2013.01); *F16D 65/0068* (2013.01); *F16D 2055/0016* (2013.01); *F16D 2200/003* (2013.01); *F16D 2200/006* (2013.01); *F16D 2200/0056* (2013.01)

(58) Field of Classification Search
CPC .......... F16D 65/0068; F16D 65/0075; F16D 2200/0056; F16D 2200/0052; F16D 2200/006; F16D 2055/0016

USPC .................. 188/71.1, 72.1, 72.4, 151 R, 152
See application file for complete search history.

(56) References Cited

U.S. PATENT DOCUMENTS

| | | | | |
|---|---|---|---|---|
| 3,616,876 A | * | 11/1971 | Brooks | 188/73.45 |
| 3,648,807 A | * | 3/1972 | Lottridge et al. | 188/73.43 |
| 4,318,458 A | * | 3/1982 | Ritsema | 188/73.44 |
| 4,385,680 A | | 5/1983 | DuCharme et al. | |
| 5,172,793 A | | 12/1992 | Temple et al. | |
| 7,404,474 B2 | * | 7/2008 | Yamaki et al. | 188/376 |
| 8,857,575 B2 | * | 10/2014 | Philpott | 188/73.38 |
| 2002/0086165 A1 | * | 7/2002 | Davis et al. | 428/446 |
| 2002/0094427 A1 | * | 7/2002 | Edwards et al. | 428/297.4 |

(Continued)

FOREIGN PATENT DOCUMENTS

| | | |
|---|---|---|
| DE | 19647999 A | 11/1996 |
| EP | 0725697 B1 | 9/1997 |

(Continued)

OTHER PUBLICATIONS ePLAS, Engineered & Industrial Plastics.*

*Primary Examiner* — Thomas J Williams
(74) *Attorney, Agent, or Firm* — Nicolo Davidson; Waller Lansden Dortch & Davis, LLP (57) ABSTRACT

Caliper bodies are provided for disc brakes suitable for being arranged astride of a disc for a disc brake, which include an attachment side portion, a non-attachment side portion and at least one bridge, said bridge being suitable for connecting such side portions and for being arranged astride of the disc, wherein the caliper body includes at least one portion made from thermoplastic material, reinforced with carbon fibres, with resistance to a temperature of at least 200° C. Disc brakes which incorporate such caliper bodies are also provided.

21 Claims, 5 Drawing Sheets

(56) References Cited

U.S. PATENT DOCUMENTS

| | | | |
|---|---|---|---|
| 2004/0200674 A1* | 10/2004 | Campbell | 188/26 |
| 2006/0216490 A1* | 9/2006 | Ishii et al. | 428/292.1 |
| 2010/0038190 A1* | 2/2010 | Renz et al. | 188/72.4 |

FOREIGN PATENT DOCUMENTS

| | | | |
|---|---|---|---|
| GB | 2087490 A | | 5/1982 |
| GB | 2115892 A | * | 9/1983 |
| GB | 2176725 A | | 1/1987 |
| JP | S59-34991 A | | 2/1984 |
| JP | H5-27365 U | | 4/1993 |
| JP | 2004225764 A | | 8/2004 |
| JP | 2008039046 A | | 2/2008 |
| JP | 2010190405 A | | 9/2010 |
| WO | 03081071 A1 | | 10/2003 |

* cited by examiner

CALIPER BODIES MADE FROM THERMOPLASTIC MATERIAL

CROSS-REFERENCE TO RELATED APPLICATIONS

This application is a National Phase Application of PCT International Application No. PCT/IT2011/000142, International Filing Date, May 9, 2011 which is hereby incorporated by reference in its entirety.

The present invention concerns a caliper body made from thermoplastic material.

FIELD OF THE INVENTION

In particular, the present invention concerns a caliper body for a disc brake for a motor vehicle and a disc brake comprising such a caliper body.

BACKGROUND OF THE INVENTION

Generally, in disc brakes, the brake caliper is arranged astride of the outer peripheral edge of a brake disc. The brake caliper usually comprises a body having two elongated elements, called side portions, which are arranged so as to face opposite braking surfaces of a disc. Between each side portion of the caliper and the braking surfaces of the brake disc, friction pads are provided. At least one of the side portions of the body of the caliper has cylinders suitable for receiving pistons, actuated in any suitable known way (for example hydraulic or electric pistons), capable of exerting a thrusting action on the pads, abutting them against the braking surfaces of the disc to exert a braking action on the vehicle.

The brake calipers are usually fixedly connected to a support structure that stays fixed to the vehicle, such as for example an axle-journal of a vehicle's suspension.

In a typical arrangement, one of the two side portions has two or more attachment portions of the body of the caliper to the bearing structure, for example by providing slots or eyelets, for example arranged axially, or through holes, for example arranged radially, suitable for receiving screws for the attachment of the caliper that, with their ends, are received in threaded holes provided on the bearing of the caliper.

Such a side portion is called attachment side portion.

The other portion is called non-attachment side portion.

In a typical construction of a caliper body, the side portions facing the braking surfaces of the disc are connected together by bridge elements arranged astride of the disc and called bridges.

Generally, a caliper body is made mainly from aluminium.

Such a material is satisfying from the point of view of resistance to stress and rigidity, however aluminium caliper bodies have a high weight.

As it is well-known, a caliper body with a high weight constitutes a serious drawback for different reasons, including the performance of the vehicle on which it is applied and the braking efficiency.

Such drawbacks are even worse in the case of racing vehicles, for which weight-reduction is essential.

In order to obtain a caliper body that, apart from achieving sufficient rigidity and resistance to stress, has also a low weight, different solutions have been studied.

For example, the patent application published with No. GB 2 087 490 discloses a caliper for a disc brake made from aluminium that comprises a steel or titanium insert.

The patent application published with No. DE 196 47 999 discloses an aluminium caliper provided with a reinforcement made from composite material having a metallic matrix.

European patent No. EP 0 725 697 discloses a method for producing a caliper that provides the moulding of a bridge and of an outer portion of an arm and in which an insert made from iron alloy is used.

The US patent application published with No. US 2010/0038190 discloses a caliper obtained by moulding with a light metal or an alloy thereof, which comprises a structure made from iron or an alloy thereof.

The aforementioned known solutions, although they achieve the desired mechanical strength and rigidity, do not achieve satisfying advantages in terms of weight reduction.

SUMMARY OF THE INVENTION

The object of the present invention is therefore to provide a caliper body for a disc brake that achieves a sufficient weight reduction, as well as high mechanical strength and structural rigidity.

These and other objects are achieved through a caliper body for a disc brake suitable for being arranged astride of a disc for a disc brake, comprising an attachment side portion, a non-attachment side portion and at least one bridge, said bridge being suitable for connecting such side portions and for being arranged astride of the disc, wherein the caliper body comprises at least one portion made from thermoplastic material reinforced with carbon fibres with resistance to a temperature of at least 200° C.

In the present context, the resistance of a material to a certain temperature indicates that the material is able to maintain suitable mechanical features at such a temperature.

In the present context the temperature resistance values are Vicat Softening Temperature values, determined through ASTM D 1525 and ISO 306.

Thanks to the presence of a thermoplastic material with high thermal resistance, it is possible to assure the mechanical performance of the disc brake even at high temperatures.

The presence of a reinforcing material made from carbon fibres gives the material sufficient rigidity.

The combination of the aforementioned features achieves a caliper body which is efficient, resistant to stresses, also to high temperatures, and above all that has a low weight.

The features described and claimed herin achieve a reduction in the dimensions of caliper bodies, while maintaining advantageous mechanical properties.

Preferably, the thermoplastic material reinforced with carbon fibres has resistance to a temperature of at least 230° C.

Advantageously, the portion made from thermoplastic material reinforced with carbon fibres is arranged at at least one from the attachment side portion and the non-attachment side portion and/or at at least one bridge.

In accordance with a preferred embodiment, the caliper body comprises two bridges, each arranged at one longitudinal end of the caliper body and the portion made from thermoplastic material reinforced with carbon fibres is arranged at said two bridges and at said attachment side portion.

In accordance with an alternative embodiment, the portion made from thermoplastic material reinforced with carbon fibres is arranged at an outer surface of the caliper body.

In this case it is possible to obtain the portion made from thermoplastic material directly on the portion made from metal by using the latter as a mould for the pressing of the thermoplastic material.

This makes it possible to obtain an excellent adhesion between the metallic material and the thermoplastic material.

Advantageously, the portion made from thermoplastic material reinforced with carbon fibres is integral with the caliper.

In this case it is possible to obtain optimal rigidity values of the caliper.

Alternatively, the portion made from thermoplastic material is fixed to the remaining portions preferably through attachment means.

In accordance with an alternative embodiment, the whole caliper body is made from thermoplastic material reinforced with fibres.

Preferably, the thermoplastic material reinforced with carbon fibres has a modulus of elasticity not lower than 70 GPa, at least in the direction of opening of the caliper.

More preferably, such a value is not lower than 100 GPa.

Advantageously, the carbon fibres of the thermoplastic material are continuous fibres. This gives the advantage that they can be suitably stretched and oriented with respect to the geometry of the caliper so as to have the desired mechanical strength.

Preferably, the carbon fibres of the reinforced thermoplastic material are oriented fibres. This gives improved mechanical properties in the desired directions, typically in the directions in which the material is most stressed.

In accordance with preferred embodiments the thermoplastic material comprises one or more materials selected from: PEEK (polyether ether ketone), PEI (polyether imide), PES (polyethersulfone), PPS (polyparaphenylene sulphide), PA46 (polyamide 46), PPA (polyphthalamide).

Preferably, the carbon fibres of the reinforced thermoplastic material comprise one or more materials selected from: HT fibres (high tenacity fibres), IM fibres (intermediate modulus fibres) and HM fibres (high modulus fibres).

In accordance with one embodiment, the caliper body is made from aluminium or an alloy thereof or from magnesium or an alloy thereof, in its non-polymeric portion, should this be present.

The present invention also concerns a disc brake comprising such a caliper body.

In order to better understand the invention and appreciated its advantages, non-limiting embodiments of caliper bodies representative of the invention are described in more detail below, with reference to the attached figures.

DETAILED DESCRIPTION

With reference to such figures, a caliper body for a disc brake suitable for being arranged astride of a disc for a disc brake is wholly indicated with 1.

The disc defines a first braking surface and a second braking surface, opposite the first braking surface.

The caliper body 1 comprises an attachment side portion 2 suitable for facing the first braking surface with one axially inner surface thereof. It is also suitable for being connected to a bearing structure for the caliper, for example a portion defining a through hole suitable for receiving attachment means of the caliper body 1 to a bearing structure of the caliper body 1 itself, for example an axle-journal of a vehicle's suspension.

The caliper body 1 also comprises a non-attachment side portion 3 that is suitable for facing the second braking surface with one axially inner surface thereof.

In other words, the side portions are arranged at opposite surfaces of the disc.

The attachment side portion 2 and the non-attachment side portion 3 are connected together by means of at least one bridge 4 that is suitable for connecting such side portions and, once the disc brake has been assembled, for being arranged astride of the disc.

The attachment side portion 2 and the non-attachment side portion 3 are preferably provided with at least one cavity 5 that houses, or forms, at least one cylinder. Each cylinder is suitable for receiving a piston to exert a pressure on at least one pad arranged, or housed, between the side portion and the respective braking surface of the disc.

Such cylinders may be actuated hydraulically, electrically or in any other known way.

The pads advantageously comprise support plates for friction linings.

According to the present invention, the caliper body 1 comprises at least one portion made from thermoplastic material reinforced with carbon fibres with high thermal resistance, i.e. with resistance to a temperature equal to at least 200° C.

Preferably, such a material has resistance to a temperature equal to at least 230° C.

More preferably, such a material withstands at least 250° C.

As mentioned before, the resistance of a material to a certain temperature indicates that the material is able to maintain suitable mechanical features at such a temperature.

In other words, as the temperature increases and until such a certain temperature is reached, the mechanical features of the material remain substantially unchanged with respect to the features of the material at room temperature or else they undergo a variation without however leaving the range of applicability.

In other words, the variation is such that the mechanical features are still suitable.

Such a variation is also reversible, i.e. by cooling the material down to room temperature the mechanical characteristics go back to the values prior to heating.

Moreover, the variation is such that the portion made with such a material does not undergo any plastic deformation up to such a certain temperature.

The portion made from thermoplastic material reinforced with carbon fibres is arranged at at least one bridge 4.

Alternatively or in addition, such a portion made from thermoplastic material reinforced with carbon fibres may be arranged at at least one from the attachment side portion 2 and the non-attachment side portion 3.

Figure 1:
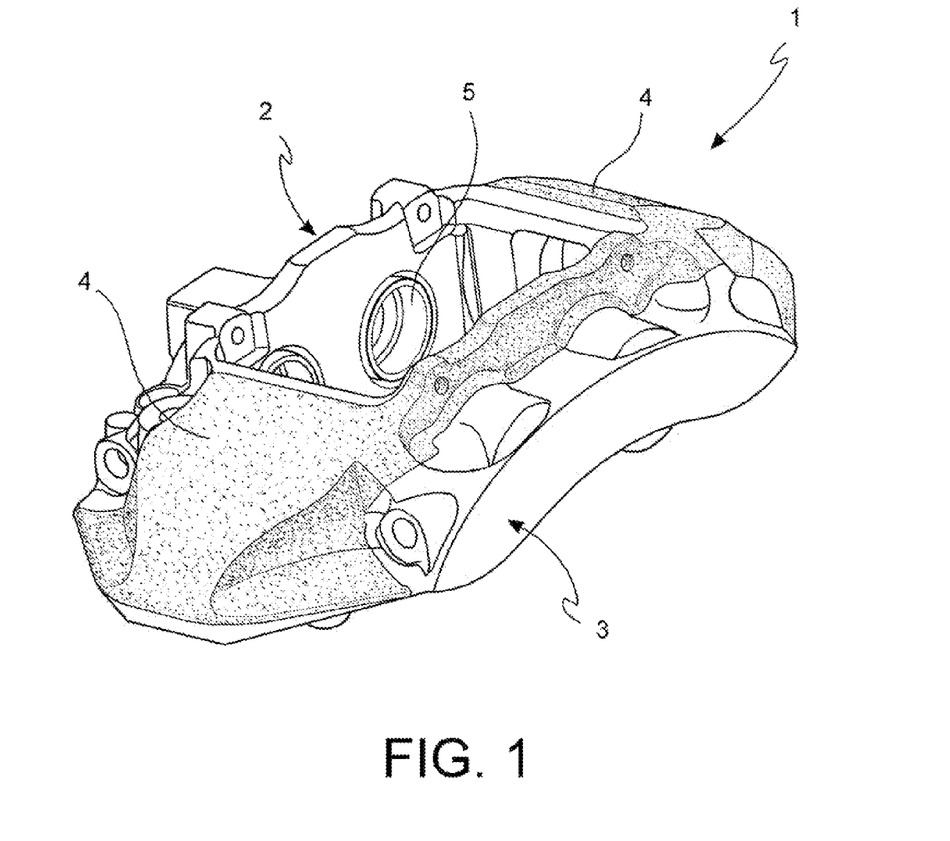
FIG. 1 is a perspective view of a caliper body according to a first embodiment of the invention.
Figure 2:
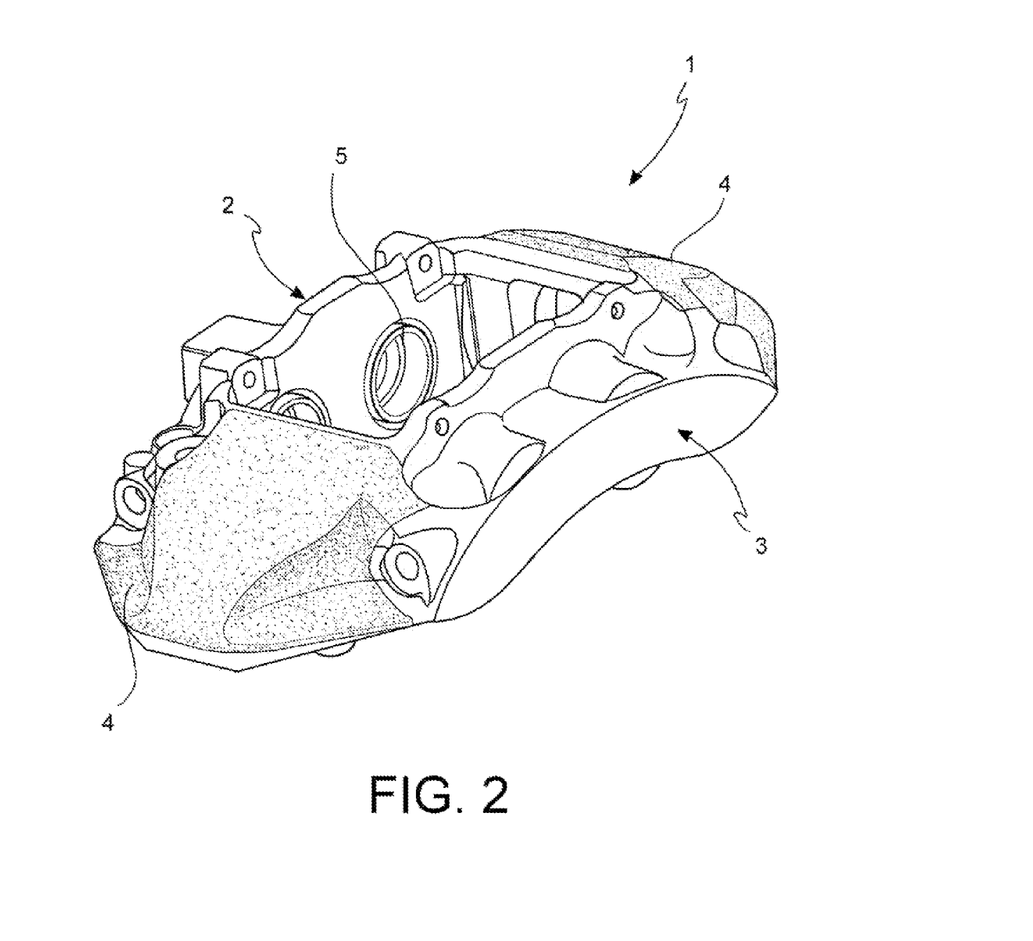
FIG. 2 is a perspective view of a caliper body according to a second embodiment of the invention.
Figure 3:
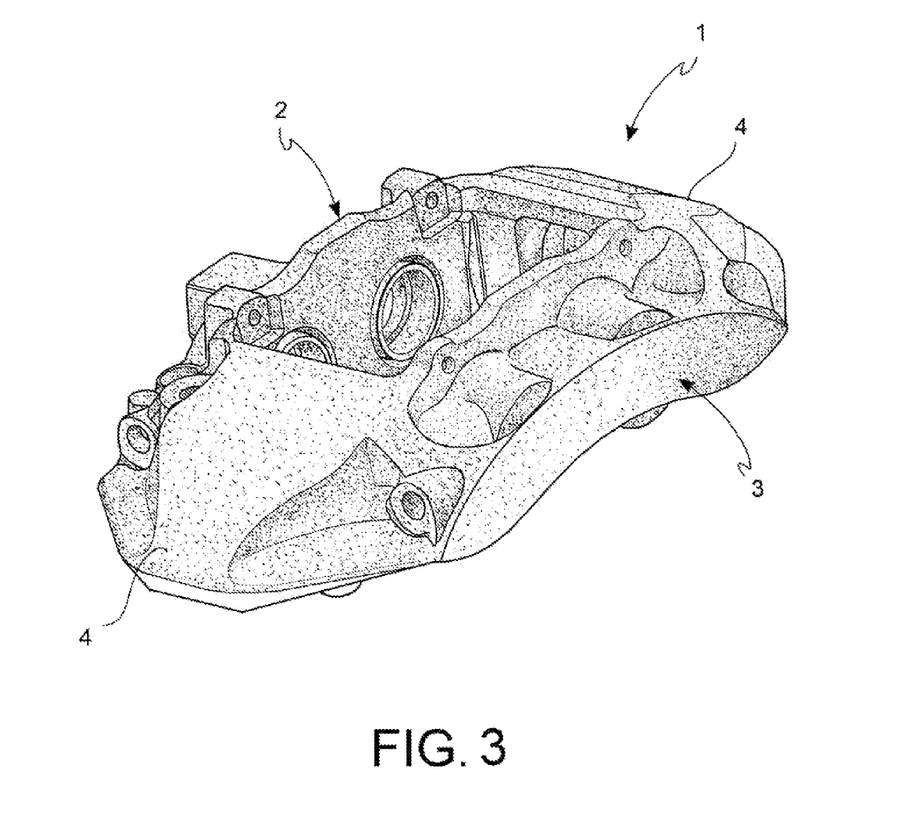
FIG. 3 is a perspective view of a caliper body according to a third embodiment of the invention.

In accordance with the embodiments shown in FIGS. 1-3, the caliper body 1 comprises two bridges 4, each arranged at one longitudinal end of the caliper body 1 and the portion made from thermoplastic material reinforced with carbon fibres is arranged at both of such bridges 4.

In particular, in the first embodiment shown in FIG. 1, the thermoplastic material is arranged at both of the bridges 4 and at the non-attachment side portion 3.

On the other hand, in the second embodiment, shown in FIG. 2, such a thermoplastic material is arranged only at the two bridges 4.

In the third embodiment, shown in FIG. 3, the whole caliper body 1 is made from thermoplastic material reinforced with carbon fibres.

Figure 4:
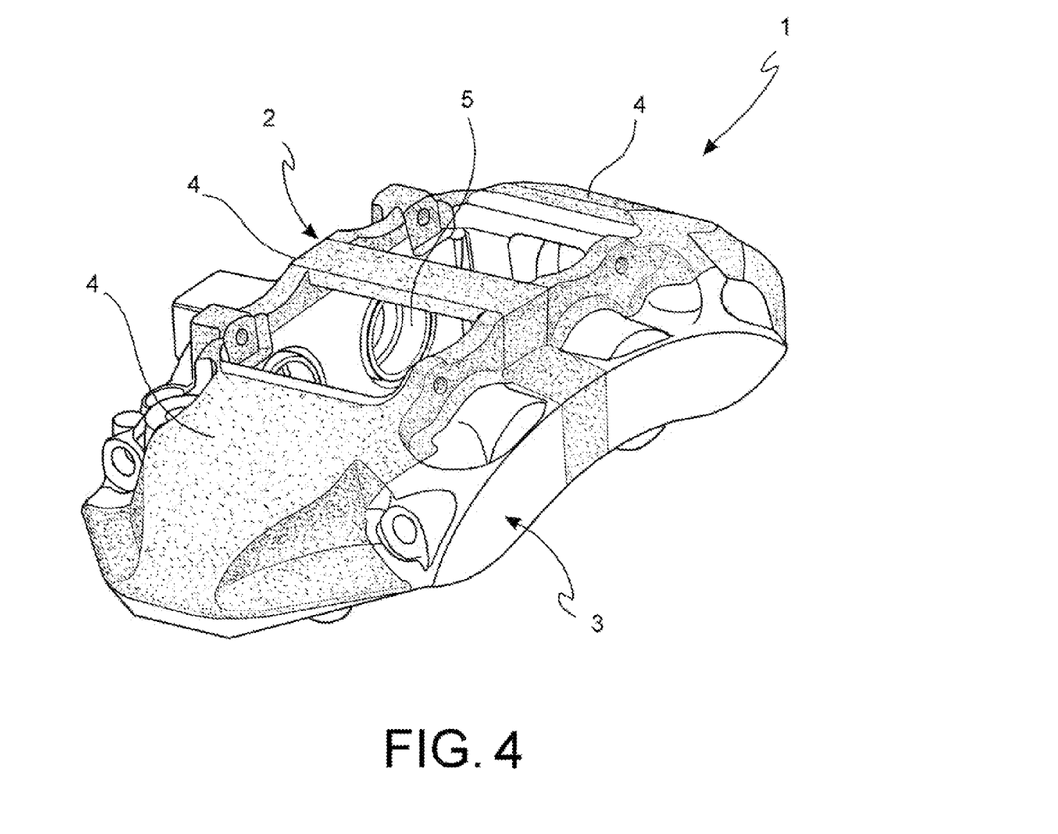
FIG. 4 is a perspective view of a caliper body according to a fourth embodiment of the invention.

In the fourth embodiment, shown in FIG. 4, the caliper body 1 comprises three bridges 4, two of which are arranged at each longitudinal end of the caliper body 1 and a third arranged in an intermediate position between the first two.

As it may be seen in FIG. 4, in such an embodiment the portion made from thermoplastic material reinforced with carbon fibres is arranged at each of the three bridges 4 and at both of the side portions, i.e. the attachment side portion 2 and the non-attachment side portion 3.

A further embodiment, not shown in the figures, provides that the portion made from thermoplastic material constitutes the outer portion of the caliper body 1. In other words, the base structure of the caliper body 1 is made from any known material and the thermoplastic material is arranged at an outer surface thereof, externally coating the base structure.

In the case in which only a portion of the caliper body 1 is made from thermoplastic material reinforced with fibres, the remaining portion of the caliper body 1 is preferably made from aluminium or magnesium.

Moreover, preferably, the portion made from thermoplastic material reinforced with carbon fibres is integral with the caliper.

This embodiment may be obtained by carrying out the portion made from thermoplastic material directly on the portion made from metal using the latter as a mould for the pressing of the thermoplastic material reinforced with fibres.

Alternatively, in the case in which the portion made from thermoplastic material reinforced with carbon fibres is not integral with the caliper, it is fixed to the remaining portions of the caliper body 1 through screws that keep the side attachment and non-attachment surfaces joined, between which the bridges are inserted astride of the disc.

In this case it is possible to increase the roughness of the contact surfaces so that the portion made from thermoplastic material is kept constantly in contact with the remaining portions of the caliper avoiding mutual sliding of the contact surfaces.

Summarising, the portions made from reinforced thermoplastic material may be made separately, assembled and mechanically constrained to the portions made from aluminium or else they may be made directly on the components made from aluminium to promote the adhesion between the surfaces.

The thermoplastic material reinforced with fibres is preferably pre-tensioned, so as to exert a force on the structure of the caliper.

Such a thermoplastic material reinforced with carbon fibres has a modulus of elasticity not lower than 70 GPa and preferably not lower than 100 GPa. Such values are preferably measured with flexing and traction tests according to standards ASTM D790 and ASTM F606.

In accordance with preferred embodiments, the thermoplastic material comprises one or more materials selected from: PEEK (polyether ether ketone), PEI (polyether imide), PES (polyethersulfone), PPS (polyparaphenylene sulphide), PA46 (polyamide 46), PPA (polyphthalamide).

Preferably, the carbon fibres of the thermoplastic material are continuous and/or oriented fibres.

In the case of oriented fibres, the polymeric material acquires anisotropic properties.

In particular, the fibres are oriented so as to confer the caliper body properties of high mechanical strength in the direction perpendicular to the outer surfaces of the disc. The areas of the caliper situated at such surfaces are the most stressed areas during braking and are stressed in the direction perpendicular to the outer surfaces of the disc.

Moreover, the fibres are oriented so as to confer high resistance also to the torsional forces that act on the brake caliper during braking.

Said carbon fibres of the reinforced thermoplastic material comprise one or more materials selected from: HT fibres (high tenacity fibres), IM fibres (intermediate modulus fibres) and HM fibres (high modulus fibres).

We will now describe some examples of the caliper body 1 according to the present invention for illustrating and not limiting purposes.

EXAMPLE 1

A caliper body 1 was made from aluminium comprising portions made from PEI (polyether imide) reinforced with IM7 fibres (55% vol) at the two bridges 4 and the non-attachment side portion 3.

Such a caliper body 1 was made according to the known procedures for making metallic materials in the portions made from aluminium and according to the known procedures for making thermoplastics reinforced with continuous fibres and/or oriented fibres in the portions made from thermoplastic material reinforced with fibres, i.e. in the portions made from PEI reinforced with IM7 fibres.

In particular, for the thermoplastic portion was selected a layup with fibres oriented at 80% in the closing direction of the caliper so as to give the maximum stiffening contribution in the operating direction. In this case the material has a modulus of elasticity of about 120 GPa up to temperatures of 200° C. along such a closing direction.

Figure 5:
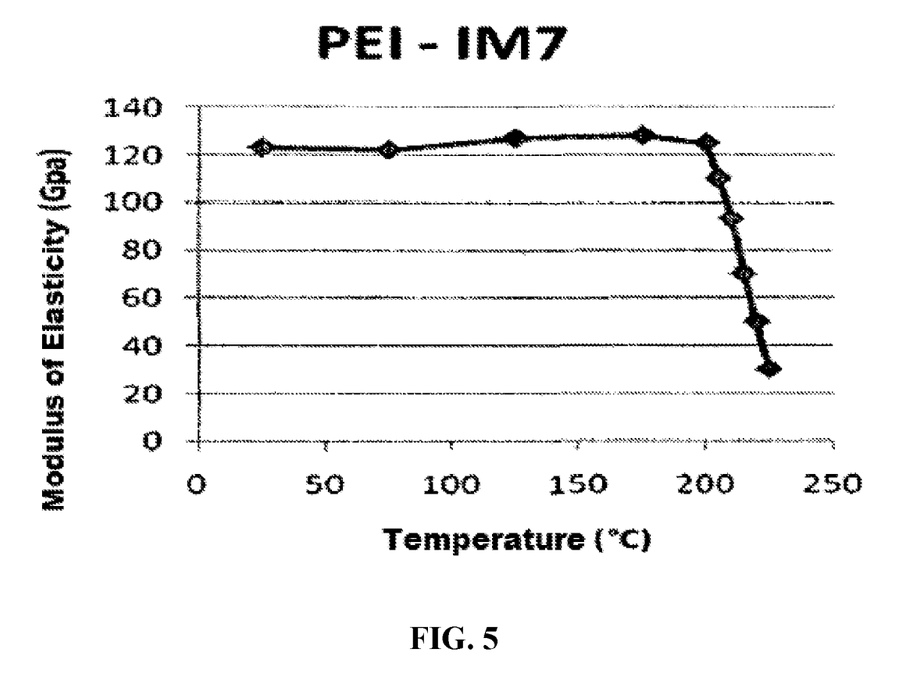
FIG. 5 is a diagram illustrating the effect of temperature on the modulus of elasticity of the thermoplastic material.

Referring now to FIG. 5, a diagram is shown that illustrates the trend of the properties of the thermoplastic material with temperature. In particular, the diagram illustrates the progression of the modulus of elasticity with temperature.

As it may be seen from the diagram, the modulus of elasticity of the material used is substantially constant up to about 200° C.

At about 215° C. the modulus of elasticity is about 70 Gpa, i.e. the properties of mechanical strength are still within the acceptable range for the present application.

The polymeric material reinforced with fibres used in the present example has a density of about 1.55 g/cm$^3$, whereas the density of the aluminium is about 2.7 g/cm$^3$. Therefore, the more the extent of the portion made from polymeric material increases, the more the caliper body is light, the volume being equal.

EXAMPLE 2

A caliper body 1 was made from aluminium comprising portions made from PEI reinforced with IM7 fibres (55% vol) exclusively at the two bridges 4.

The caliper body was made according to the same procedures as example 1.

EXAMPLE 3

A caliper body 1 was made from aluminium comprising an outer casing made from PEI reinforced with IM7 fibres (55% vol).

The body made from aluminium was used as a base for the moulding of the portion made from thermoplastic material reinforced with fibres, or used as a mould for the pressing of the thermoplastic material.

The contact surfaces between aluminium and thermoplastic were made so as to ensure the absence of mutual sliding.

EXAMPLE 4

A caliper body 1 was made entirely from PEI reinforced with IM7 fibres (55% vol).

The caliper body was made entirely according to the procedure used in example 1 in relation to the polymeric portions.

EXAMPLE 5

Comparative

A caliper body 1 was made entirely from aluminium, according to the procedures known in the field.

Each of the caliper bodies 1 described in the five previous examples was subjected to dyno tests in order to check their performances. Such tests were carried out both in applications with a steel disc and in applications with a disc made from carbon-material (CCM).

In particular, the tests were carried out in the following two conditions:

1. Steel disc
   Disc dimensions=328×32 mm;
   Caliper of the P4 38/42 type;
   Vehicle inertia=31 kg m2.
2. Disc made from CCM (carbon-ceramic material reinforced with fibres)
   Disc dimensions=380×34 mm;
   Caliper of the M6-30/34/38 type;
   Vehicle inertia=60 kg m2.

RESULTS

The caliper bodies 1 of examples 1, 2, 3 and 4 showed a rigidity at least 20% greater than the caliper body 1 of example 5 in both applications.

The caliper of example 3, i.e. the caliper with the entire casing made from thermoplastic material reinforced with fibres, also showed big improvements in handling the decrease of the temperatures generated with a much lower flow towards the oil-hydraulic system.

The better results were obtained with the caliper body 1 of example 4 that showed an increase in rigidity equal to 40% with respect to the caliper body 1 of example 5 along with a decreased weight of the order of 40-50%.

The present invention also concerns a disc brake comprising a caliper body 1 as described earlier.

In the preceding description and in the following claims, all of the numerical values indicating quantities, parameters, percentages, and so on should in all circumstances be considered to be preceded by the term "about" unless indicated otherwise. Moreover, all of the ranges of numerical values include all of the possible combinations of maximum and minimum numerical values, as well as those specifically indicated in the text.

Of course, the man skilled in the art, in order to satisfy contingent and specific requirements, may bring further modifications and variants to the caliper body according to the present invention, all of which are in any case within the scope of the present invention.

The invention claimed is:

1. A caliper body for a disc brake suitable for being arranged astride of a disc for a disc brake, said caliper body comprising:
   an attachment side portion;
   a non-attachment side portion; and
   at least two bridges that are suitable for connecting the attachment side portion and the non-attachment side portion and for being arranged astride of the disc, two of the at least two bridges being arranged at opposite longitudinal ends of the caliper body;
   wherein at least one of the attachment side portion, the non-attachment side portion, and the at least two bridges comprise a reinforced thermoplastic material reinforced with pre-tensioned carbon fibres which exert a force on the structure of the caliper;
   wherein said reinforced thermoplastic material has a temperature resistance value of at least 200° C., mechanical features of the reinforced thermoplastic material remaining substantially unchanged or varying reversibly at temperatures between room temperature and the temperature resistance value; and
   wherein said reinforced thermoplastic material is moulded and integral with the caliper body.

2. The caliper body of claim 1, wherein the temperature resistance value is at least 230° C.

3. The caliper body of claim 1, wherein the attachment side portion, the non-attachment side portion, or both comprise the reinforced thermoplastic material.

4. The caliper body of claim 1, wherein at least one of the at least two bridges comprise the reinforced thermoplastic material.

5. The caliper body of claim 1, wherein the caliper body comprises two bridges, and wherein the two bridges comprise the reinforced thermoplastic material.

6. The caliper body of claim 1, wherein the caliper body comprises three bridges, and wherein the three bridges, the attachment side portion, and the non-attachment side portion comprise the reinforced thermoplastic material.

7. The caliper body of claim 1, wherein the non-attachment side portion and the at least two bridges comprise the reinforced thermoplastic material.

8. The caliper body of claim 1, wherein the reinforced thermoplastic material has a modulus of elasticity of at least 70 GPa.

9. The caliper body of claim 1, wherein the carbon fibres comprise continuous fibres.

10. The caliper body of claim 1, wherein the carbon fibres comprise oriented fibres.

11. The caliper body of claim 1, wherein the reinforced thermoplastic material comprises one or more materials selected from the group consisting of: PEEK (polyether ether ketone), PEI (polyether imide), PES (polyethersulfone), PPS (polyparaphenylene sulphide), PA46 (polyamide 46), and PPA (polyphthalamide).

12. The caliper body of claim 1, wherein the carbon fibres comprise one or more materials selected from the group consisting of: HT fibres (high tenacity fibres), IM fibres (intermediate modulus fibres), and HM fibres (high modulus fibres).

13. The caliper body of claim 1, wherein at least one of the attachment side portion, the non-attachment side portion, and the at least two bridges comprise a material selected from the group consisting of: aluminium, aluminium alloy, magnesium and magnesium alloy.

14. A disc brake comprising the caliper body of claim 1.

15. The caliper body of claim 5, wherein only the two bridges comprise the reinforced thermoplastic material.

16. The caliper body of claim 1, wherein the attachment side portion, the non-attachment side portion, and the at least two bridges are made from material selected from the group consisting of: aluminium, aluminium alloy, magnesium, and magnesium alloy.

17. The caliper body of claim 16, wherein the reinforced thermoplastic material is arranged at an outer surface of the attachment side portion, an outer surface of the non-attachment side portion, and an outer surface of the at least two bridges.

18. The caliper body of claim 1, wherein the reinforced thermoplastic material is arranged at an outer surface of the attachment side portion, an outer surface of the non-attachment side portion, and an outer surface of the at least two bridges.

19. The caliper body of claim 1, wherein the attachment side portion, the non-attachment side portion, and the at least two bridges comprise the reinforced thermoplastic material.

20. The caliper body of claim 19, wherein the plurality of portions comprise a material selected from the group consisting of: aluminium, aluminium alloy, magnesium, and magnesium alloy; and wherein the reinforced thermoplastic material is arranged on an outer surface of at least one of the portions.

21. A caliper body, comprising:
a plurality of portions, including:
an attachment side portion;
a non-attachment side portion; and
two bridges, the two bridges being configured to connect the attachment side portion and the non-attachment side portion and to be arranged astride of the disc;
wherein at least one of the portions include a reinforced thermoplastic material reinforced with pre-tensioned carbon fibres which exert a force on the structure of the caliper;
wherein the reinforced thermoplastic material has a resistance to temperatures of at least 200° C.; and
wherein the reinforced thermoplastic material is integral with the caliper body.

\* \* \* \* \*